United States Patent
Bush et al.

(10) Patent No.: US 12,339,403 B2
(45) Date of Patent: Jun. 24, 2025

(54) ADAPTIVE AVALANCHE PHOTODIODE BIAS SET POINT CALIBRATION SYSTEM AND METHOD

(71) Applicant: Luminar Technologies, Inc., Orlando, FL (US)

(72) Inventors: Adam R. Bush, Shakopee, MN (US); Kevin A. Gomez, Shakopee, MN (US)

(73) Assignee: LUMINAR TECHNOLOGIES, INC., Orlando, FL (US)

( * ) Notice: Subject to any disclaimer, the term of this patent is extended or adjusted under 35 U.S.C. 154(b) by 933 days.

(21) Appl. No.: 17/494,151

(22) Filed: Oct. 5, 2021

(65) Prior Publication Data

US 2022/0120880 A1    Apr. 21, 2022

Related U.S. Application Data

(60) Provisional application No. 63/094,025, filed on Oct. 20, 2020.

(51) Int. Cl.
| | |
|---|---|
| *G01S 7/497* | (2006.01) |
| *G01S 7/487* | (2006.01) |
| *G01S 7/493* | (2006.01) |

(52) U.S. Cl.
CPC .......... *G01S 7/497* (2013.01); *G01S 7/4873* (2013.01); *G01S 7/493* (2013.01)

(58) Field of Classification Search
None
See application file for complete search history.

(56) References Cited

U.S. PATENT DOCUMENTS

| | | | |
|---|---|---|---|
| 3,644,740 A * | 2/1972 | Dobratz | G01S 7/4873 250/214 R |
| 7,560,683 B2 | 7/2009 | Takahashi et al. | |
| 8,742,316 B2 | 6/2014 | Kim et al. | |
| 9,048,370 B1 | 6/2015 | Urmson et al. | |
| 9,121,766 B2 | 9/2015 | Mazzillo et al. | |
| 9,529,079 B1 | 12/2016 | Droz et al. | |

(Continued)

OTHER PUBLICATIONS

Williams, "Bias Voltage and Current Sense Circuits for Avalanche Photodiodes", Linear Technology, Application Note 92, Nov. 2002, 32 pages.

*Primary Examiner* — Eric L Bolda
(74) *Attorney, Agent, or Firm* — HOLZER PATEL DRENNAN

(57) ABSTRACT

An optical engine for a LiDAR system comprises an analog detection channel comprising an avalanche photodiode (APD) optically coupled to light receiving optics and bias circuitry coupled to the APD and configured to adjust a bias set point (BSP) of the APD. Sensors sense disparate environmental factors that impact optical engine performance. Memory stores pre-established APD BSP data including a nominal APD BSP and pre-established dependence data characterizing the impact of disparate environmental factors on the nominal APD BSP. A controller generates, using sensor signals, in-field dependence data characterizing the impact the disparate environmental factors currently have on the nominal APD BSP, calculate an updated APD BSP using the in-field and pre-established dependence data, and shift the BSP of the APD from the nominal APD BSP to the updated APD BSP to enhance optical engine performance.

22 Claims, 7 Drawing Sheets

(56) References Cited

U.S. PATENT DOCUMENTS

| | | | |
|---|---|---|---|
| 9,772,399 B2 | 9/2017 | Schwarz et al. | |
| 9,971,024 B2 | 5/2018 | Schwarz et al. | |
| 9,985,071 B2 | 5/2018 | Irish et al. | |
| 10,312,382 B2 | 6/2019 | Cha et al. | |
| 10,594,965 B2 | 3/2020 | Oh | |
| 2017/0031009 A1* | 2/2017 | Davidovic | G01S 7/4865 |
| 2018/0275252 A1 | 9/2018 | Fried et al. | |
| 2018/0284239 A1 | 10/2018 | Lachapelle et al. | |
| 2018/0284272 A1 | 10/2018 | Adut | |
| 2019/0041517 A1* | 2/2019 | Ichiyanagi | G01S 7/4868 |
| 2019/0250256 A1 | 8/2019 | Gunnam et al. | |
| 2019/0310354 A1 | 10/2019 | Li et al. | |
| 2021/0286051 A1* | 9/2021 | Liu | H03F 3/087 |

\* cited by examiner

ADAPTIVE AVALANCHE PHOTODIODE BIAS SET POINT CALIBRATION SYSTEM AND METHOD

RELATED PATENT DOCUMENTS

This application claims the benefit of Provisional Patent Application No. 63/094,025 filed on Oct. 20, 2020, which is incorporated herein by reference in its entirety.

SUMMARY

Embodiments are directed to an apparatus comprising an optical engine configured for incorporation in a light detection and ranging (LiDAR) system. The optical engine comprises an analog detection channel comprising an avalanche photodiode (APD) optically coupled to light receiving optics and bias circuitry coupled to the APD and configured to adjust a bias set point of the APD. A plurality of sensors are configured to sense disparate environmental factors that impact performance of the optical engine. A memory is configured to store pre-established APD bias set point data including a nominal APD bias set point and pre-established dependence data that characterizes the impact each of the disparate environmental factors has on the nominal APD bias set point. A controller is coupled to the memory and configured to generate, using signals produced by the plurality of sensors, in-field dependence data that characterizes the impact each of the disparate environmental factors currently has on the nominal APD bias set point, calculate an updated APD bias set point using the in-field dependence data and the pre-established dependence data, and shift the bias set point of the APD from the nominal APD bias set point to the updated APD bias set point to enhance optical engine performance.

Embodiments are directed to a method comprising sensing disparate environmental factors that impact performance of an optical engine incorporated in a light detection and ranging (LiDAR) system, the optical engine including an analog detection channel comprising an avalanche photodiode (APD) optically coupled to light receiving optics, and bias circuitry coupled to the APD and configured to adjust a bias set point of the APD. The method also comprises storing, in a memory, pre-established APD bias set point data including a nominal APD bias set point and pre-established dependence data that characterizes the impact each of the disparate environmental factors has on the nominal APD bias set point. The method further comprises generating, by a controller using signals produced by the plurality of sensors, in-field dependence data that characterizes the impact each of the disparate environmental factors currently has on the nominal APD bias set point. The method also comprises calculating, by the controller, an updated APD bias set point using the in-field dependence data and the pre-established dependence data, and shifting, by the controller, the bias set point of the APD from the nominal APD bias set point to the updated APD bias set point to enhance optical engine performance.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
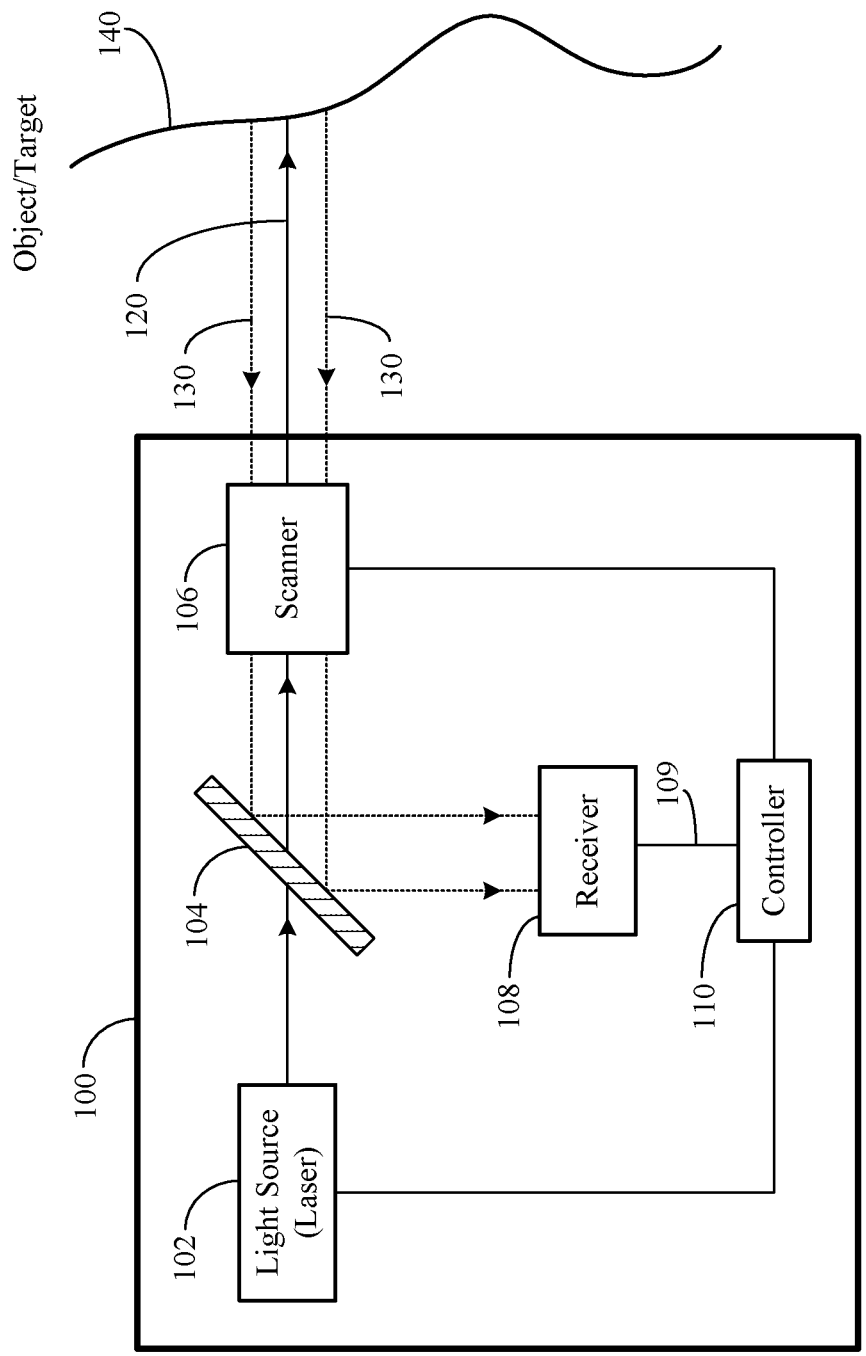
FIG. 1 illustrates a representative LiDAR system configured to incorporate an optical engine and adaptive APD bias set point calibration methodology in accordance with various embodiments.

Avalanche photodiodes are diodes with an internal gain mechanism. This gain mechanism allows APDs to detect very low optical signal strengths and even individual photons. The term avalanche refers to the internal APD gain—the so-called avalanche breakdown. APDs are faster and more sensitive than conventional photodiodes. Additionally, the spectral response of APDs is particularly high. Depending on the material, wavelengths of up to 1,700 nm can be achieved. The enhanced near-infrared (NIR) sensitivity of up to 900 nm makes APDs an ideal choice for LiDAR systems and applications. Light detection and ranging, or LiDAR, is a distance and speed measurement technique used in an increasing number of fields of mobility, such as in mobile speed control and driver assistance systems.

LiDAR is an optical remote sensing technology. A typical LiDAR system includes an emitter, which sends out infrared laser pulses, and a photodiode, which detects reflected light. The distance and relative speed of objects can be determined from the runtime of the signal (time of flight or TOF) and the speed of light. This measurement method is similar to radar, but LiDAR has the significant advantage of a much higher resolution. In addition, LiDAR systems can usually be produced at lower costs because of the less expensive components and a single system can cover short and long ranges. The advantage of a much higher angular resolution gives APDs a significant advantage over other types of photodetectors, especially when used in more complex automotive applications. Advanced driver assistance systems, such as adaptive cruise control (ACC) or collision avoidance systems, not only provide a more comfortable driving experience but are also able to reduce the severity of accidents or even prevent crashes entirely.

With their internal gain mechanism, wide dynamic range and fast rise time, APDs are ideal for LiDAR systems for optical distance measurement and object recognition using the propagation delay method. Application examples include driver assistance systems, drones, safety laser scanners, 3D measurement devices, and robotics.

Embodiments of the disclosure are directed to systems and methods for adapting the bias set point of an avalanche photodiode to enhance or optimize optical performance in response to changing environmental conditions. When using APD devices in an analog channel, there are several characteristics that need be accounted for, including DC bias to control the multiplying gain, as well as dark current noise and changing environmental factors, such as external light, temperature, and humidity. These characteristics can fundamentally change the desired analog threshold for time-of-flight (TOF) range calculations. Moreover, these characteristics can change quickly during the operation of a LiDAR unit or other type of optical sensor, for example, necessitating recalibration in real time for proper operation.

According to various embodiments, at the time of system manufacturer in the factory, a nominal (e.g., optimal) bias set point is determined for the APD together with this bias set point's dependence on environmental factors such as temperature, humidity, and ambient light levels. During use in the field, environmental factors which are significant input variables affecting the APD bias set point are sensed in real-time, such as temperature at the APD and ambient light levels at the APD. For example, factors such as temperature take time to stabilize and would affect the breakdown voltage of the APD, thus requiring different voltage settings to maintain the same gain profile. Ambient light levels besides changes during day/night can also change rapidly, for example with oncoming headlights or when an optical sensor moves through bursts of sunlight streaming through trees or structures.

According to various embodiments, a set of disparate sensors are configured to sense disparate environmental factors known to impact the APD bias set point. A feedforward methodology is used to set the nominal (e.g., optimal or baseline) APD bias set point based on disparate sensor signals acquired in real time as inputs. A real-time adaptation methodology can be implemented in accordance with various embodiments to close the gap between the factory nominal APD bias set point to an adjusted (e.g., optimal) APD bias set point, such that the adjusted APD bias set point enhances or optimizes performance of the optical sensor relative to the factory nominal APD bias the point.

According to some embodiments, adjusting the bias set point of an APD to achieve enhanced optical performance can be performed in a manner which avoids disruption of optical sensor operation. For example, adaptation of the APD bias set point in response to real-time environmental conditions can be performed without interrupting the scanning process of a LiDAR system such as by using any dead-time in the scan, for example at the end of a scan line or end of a frame. These windows of dead-time may occur at polygon facet crossings or at the extremities of a galvo scan were a detector may not be in use. In some implementations, adaptation of the APD bias set point can be spread out across a number of different dead-time windows as desired or necessary. Various methods of APD bias set point adaptation are contemplated, including the representative examples disclosed hereinbelow.

FIG. 1 illustrates a representative LiDAR system 100 configured to incorporate an optical engine and adaptive APD bias set point calibration methodology in accordance with various embodiments. The LiDAR system 100 includes a light source 102 (e.g., a laser source), a mirror 104, a scanner 106, a receiver 108, and a controller 110. The light source 102 may be, for example, a laser which emits light having a particular operating wavelength in the infrared, visible, or ultraviolet portions of the electromagnetic spectrum. By way of example, light source 102 may include a laser with an operating wavelength between approximately 1.2 µm and 1.7 µm. The light source 102 emits an output beam of light 120 which may be continuous-wave, pulsed, or modulated in any suitable manner for a given application. The scanner 106 can be configured to steer the output beam of light 120 in one or more directions downrange. For example, the scanner 106 can include one or more scanning mirrors that are configured to rotate, tilt, pivot, or move in an angular manner about one or more axes. In some implementations, a flat scanning mirror can be attached to a scanner actuator or mechanism which scans the mirror over a particular angular range.

The output beam of light 120 is directed downrange toward a remote target 140. As an example, the remote target 140 may be located a distance D of about 1 m to about 1 km from the LiDAR system 100. After the output beam 120 reaches the downrange target 140, the target 140 may scatter or reflect at least a portion of light from the output beam 120, and some of the scattered or reflected light may return toward the LiDAR system 100. In the representative example shown in FIG. 1, the scattered or reflected light is represented by input beam 130, which passes through scanner 106 and is directed by mirror 104 to receiver 108. In some implementations, a relatively small fraction of the light from output beam 120 may return to the LiDAR system 100 as input beam 130.

The receiver 108 is configured to receive or detect photons from input beam 130 and generate one or more representative signals. For example, the receiver 108 may generate an output electrical signal 109 which is representative of the input beam 130. This electrical signal 109 may be sent to a controller 110, which includes a processor, computing system (e.g., an ASIC or FPGA), or other suitable circuitry configured to analyze one or more characteristics of the electrical signal 109 to determine one or more characteristics of the target 140, such as its distance downrange from the LiDAR system 100. The controller 110 can be configured to analyze the time of flight or phase modulation for a beam of light 120 transmitted by the light source 102. If the LiDAR system 100 measures a time of flight of T (e.g., T represents the round-trip time for light to travel from the LiDAR system 100 to the target 140 and back to the LiDAR system 100), then the distance D from the target 140 to the LiDAR system 100 may be expressed as $D=c \cdot T/2$, where c is the speed of light (approximately $3.0 \times 10^8$ m/s). As an example, if a time of flight is measured to be T=300 ns, then the distance from the target 140 to the LiDAR system 100 may be determined by the controller 110 to be approximately D=45.0 m.

Figure 2:
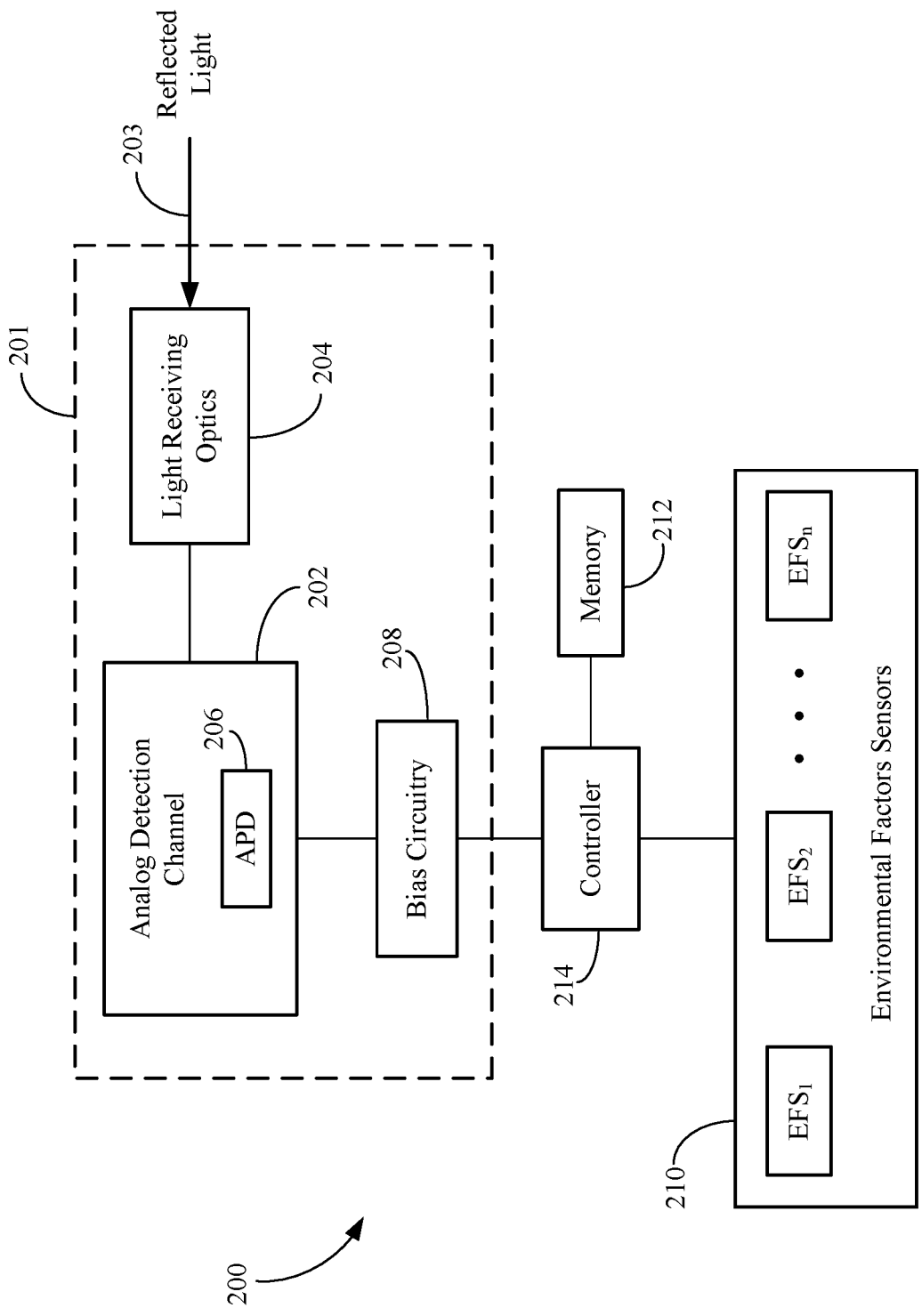
FIG. 2 illustrates an apparatus configured for incorporation in a LiDAR system in accordance with various embodiments.

FIG. 2 illustrates an apparatus 200 configured for incorporation in a LiDAR system in accordance with various embodiments. The apparatus 200 includes an optical engine 201 operatively coupled to a controller 214. The optical engine 201 includes an analog detection channel 202 optically coupled to light receiving optics 204. The optical engine 201 also includes bias circuitry 208 coupled to the analog detection channel 202. Although not shown in FIG. 2, the optical engine 201 can include an optical scanning element configured to rotate at a predetermined rotational speed while directing light from a light source (e.g., a laser) at a target (see, e.g., FIG. 1). The light receiving optics 204 are configured to receive a beam of the reflected light 203 from the target.

The analog detection channel 202 includes an avalanche photodiode 206 optically coupled to the light receiving optics 204. Bias circuitry 208 is coupled to the APD 206 and configured to adjust a bias set point of the APD 206 in accordance with various embodiments disclosed herein. As will be described in detail hereinbelow, the controller 214 and bias circuitry 208 are configured to operate cooperatively to shift the bias set point of the APD 206 to enhance optical engine performance in response to environmental factors that impact performance of the optical engine 201 in real time.

The apparatus 200 also includes a multiplicity of sensors 210 (e.g., environmental factors sensors), each of which is coupled to the controller 214. It is known, for example, that radiant energy attenuates when propagating through the atmosphere, as a function of humidity, temperature, pressure, and other variables. Atmospheric transmittance refers to the capacity of the atmosphere to transmit electromagnetic energy. Atmospheric transmittance varies for radiations of difference wavelength, such that the smaller the atmospheric absorption and scattering of light, the greater the atmospheric transmittance. Environmental factors (e.g., atmospheric effects) represent the main environmental influences on LiDAR intensity values. The laser energy is attenuated while passing through atmosphere due to scattering and absorption of laser photons. Small particles suspended in the air, such as dust or smoke (aerosol scattering) and air clusters in the atmosphere (Rayleigh scattering) cause laser scattering. Additionally, air molecules, such as water vapor, carbon dioxide, oxygen, etc., cause laser absorption and energy loss.

The multiplicity of sensors 210 are configured to sense disparate environmental factors that impact performance of the optical engine 201. For example, sensor $EFS_1$ can be configured to sense ambient light level at the APD 206. Sensor $EFS_2$ can be configured to sense ambient temperature at the APD 206. Sensor $EFS_3$ can be configured to sense ambient humidity at the APD 206. Sensor $EFS_4$ can be configured to sense ambient pressure at the APD 206. One or more additional sensors (e.g., $EFS_5 \ldots EFS_N$) can be included in the set of sensors 210 for sensing one or more other factors impacting performance of the optical engine 201. In addition to environmental factors, aging can negatively impact performance of the optical engine 201. Aging of the optical engine 201 can be estimated based on a number of inputs, including the actual age of the optical engine 201 (e.g., current date minus date of manufacture), accumulated on-time (actual usage time) of the optical engine 201, APD bias set point drift over time, and severity of environmental factors impacting the optical engine 201 (e.g., via data acquired from the set of sensors 210).

A memory 212 is operatively coupled to the controller 214. The memory 212 is configured to store pre-established APD bias set point data which includes a nominal APD bias set point and pre-established dependence data. The pre-established dependence data includes data that characterizes the impact each of a number of different environmental factors has on the nominal APD bias set point. In some implementations, the APD bias set point data are established at the time of apparatus manufacture, and is referred to herein as factory APD bias set point data. In other implementations, the APD bias set point data are established post-manufacture but prior to present real-time operation of the apparatus 200 in the field, and is referred to herein as in-field APD bias set point data. For example, the APD bias set point data can be established seconds, minutes, hours, days or months prior to present real-time usage of the apparatus 200 in the field. In further implementations, the pre-established APD bias set point data can comprise a blend of both factory APD bias set point data and in-field APD bias set point data.

According to various embodiments, the controller 214 is configured to generate, using signals produced by the set of sensors 210, in-field dependence data that characterizes the impact each of the disparate environmental factors sensed by the sensors 210 has on the nominal APD bias set point. The controller 214 is also configured to calculate an updated APD bias set point using the in-field dependence data and the pre-established dependence data. The controller 214 is further configured to shift the bias set point of the APD 206 from the nominal APD by a set point to the updated APD bias set point to enhance performance of the optical engine 201. In some embodiments, the controller 214 is configured to implement a feedforward bias set point adjustment process when adjusting the bias set point of the APD 206.

It is noted that, although the in-field and pre-established dependence data can represent sensor data for a single environmental factor (e.g., ambient light), use of in-field and pre-established dependence data representing a multiplicity of sensor data for a multiplicity of environmental factors (e.g., two or more environmental factors) provides for a more informed assessment of real-time environmental factors and, therefore, more accurate shifting of the APD bias set point in a manner which enhances optical engine performance.

Figure 3:
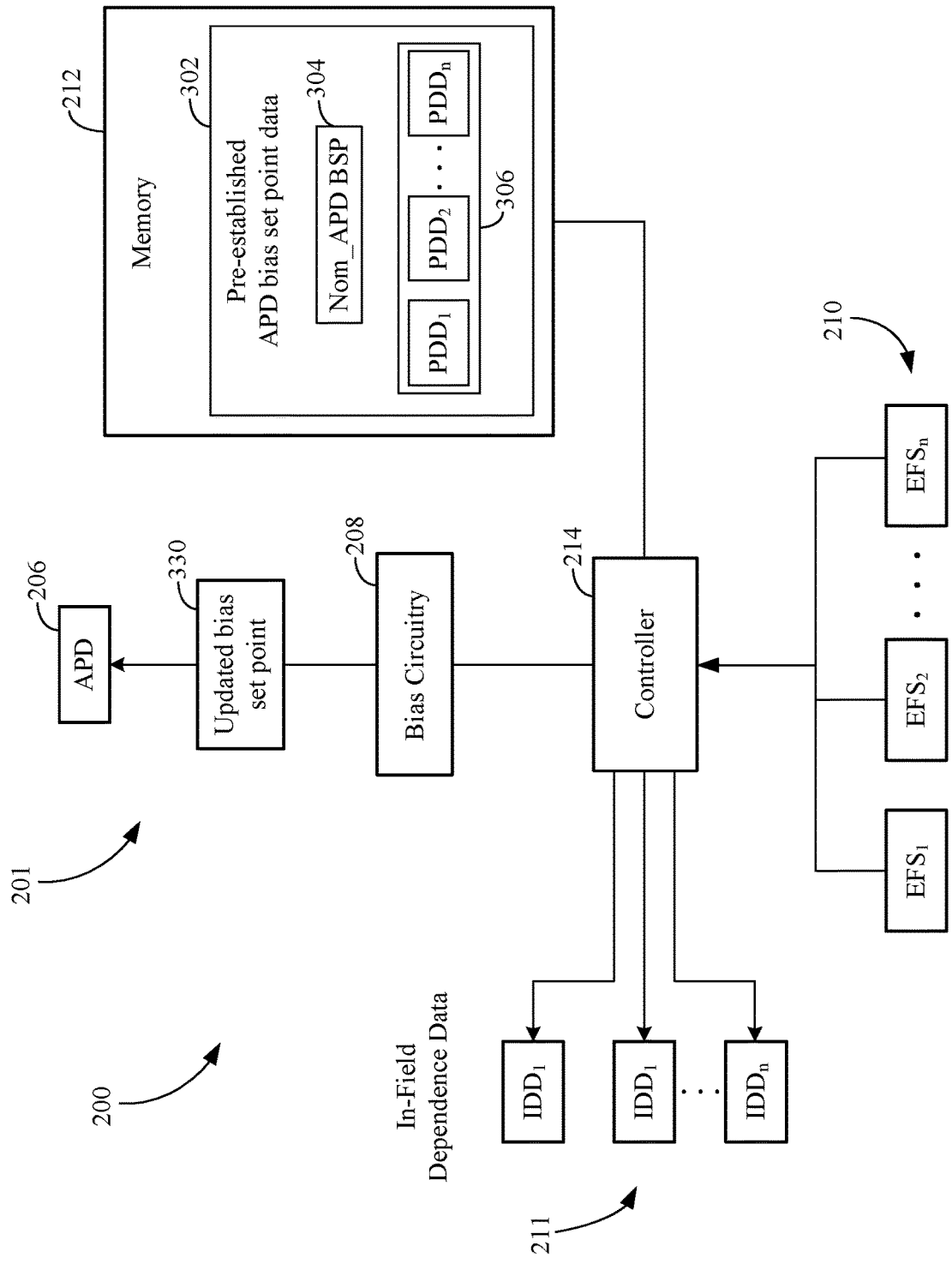
FIG. 3 illustrates additional details of the apparatus shown in FIG. 2 in accordance with various embodiments.

FIG. 3 illustrates additional details of the apparatus 200 shown in FIG. 2 in accordance with various embodiments. The apparatus 200 illustrated in FIG. 2 includes the optical engine 201 comprising bias circuitry 208 coupled to the APD 206. The controller 214 is coupled to the bias circuitry 208, memory 212, and the set of sensors 210. As is shown in FIG. 3, the memory 212 is configured to store pre-established APD bias set point data 302, which includes a nominal APD bias set point 304 and pre-established dependence data 306 ($PDD_1 \ldots PDD_n$). The pre-established dependence data 306 includes a number of data sets, $PDD_1 \ldots PDD_n$, that characterize the impact each of a number of disparate environmental factors has on the nominal APD bias set point 304 (e.g., at the time of optical engine manufacture). For example, pre-established dependence data set $PDD_1$ can include data that characterizes the impact ambient light has on the nominal APD bias set point 304. Pre-established dependence data set $PDD_2$ can include data that characterizes the impact ambient temperature has on the nominal APD bias set point 304. Pre-established dependence data set $PDD_3$ can include data that characterizes the impact ambient humidity has on the nominal APD bias set point 304. Pre-established dependence data set $PDD_4$ can include data that characterizes the impact ambient pressure has on the nominal APD bias set point 304.

The controller 214 is configured to adjust the bias set point of the APD 206 in real time to enhance or optimize performance of the optical engine 201 in response to changing environmental conditions as sensed by the set of environmental sensors 210. For example, the controller 214 is configured to generate in-field dependence data, $IDD_1$, that characterizes the impact the current ambient light level at the APD 206 has on the nominal APD bias set point 304 (e.g., at time t0 in the field). The controller 214 is configured to generate in-field dependence data, $IDD_2$, that characterizes the impact the current ambient temperature at the APD 206 has on the nominal APD bias set point 304 (e.g., at time t0 in the field). The controller 214 is configured to generate in-field dependence data, $IDD_3$, that characterizes the impact the current ambient humidity at the APD 206 has on the nominal APD bias set point 304 (e.g., at time to in the field). The controller 214 is configured to generate in-field dependence data, $IDD_4$, that characterizes the impact the current ambient pressure at the APD 206 has on the nominal APD bias set point 304 (e.g., at time to in the field).

In some implementations, each of the pre-established dependence data sets, $PDD_1 \ldots PDD_n$, and each of the in-field dependence data sets, $IDD_1 \ldots IDD_n$, comprises an array or matrix of data points that characterizes the impact each environmental factor has on the nominal APD bias set point 304. In other implementations, each of the pre-established dependence data sets, $PDD_1 \ldots PDD_n$, and each of the in-field dependence data sets, $IDD_1 \ldots IDD_n$, comprises an equation fitted to data that characterizes the impact each environmental factor has on the nominal APD bias set point 304. Each set of pre-established and in-field dependence data can be viewed as characterizing one dimension of environmental factor data impacting the set point of the APD 206. In the case of ambient light, temperature, and humidity factors, for example, the pre-established and in-field dependence data sets characterize three dimensions of environmental factor data impacting the set point of the APD 206.

In general terms, the controller 214 can be configured to compute a path through a vector defined by the in-field and pre-established dependence data to arrive at an optimal APD bias set point. The controller 214 implements a real-time adaptation methodology to close the gap between the nominal APD bias set point 304 to the updated bias set point 330 using the pre-established and in-field dependence data.

According to some embodiments, the controller 214 is configured to calculate an updated APD bias set point 330 using the in-field dependence data 211 and the pre-established dependence data 306. For example, the controller 214 can be configured to calculate the updated APD bias set point 330 by performing interpolation operations using the in-field and pre-established dependence data for each of the disparate environmental factors. The controller 214 can be configured to implement a feedforward bias set point adjustment process when adjusting the bias set point of the APD 206 from the nominal APD bias set point 304 to the updated bias set point 330. In some embodiments, the analog detection channel 206 which includes the APD 206 (see FIG. 2) has a specified gain profile, and the controller 214 is configured to adjust the bias set point of the APD 206 to achieve the specified gain profile in response to changes of the disparate environmental factors.

In accordance with various embodiments, adaptation of the APD bias set point in response to real-time environmental conditions can be performed by the controller 214 without interrupting a scanning process that involves the optical engine 201. For example, the controller 214 can be configured to shift the bias set point of the APD 206 during a LiDAR scanning process and without interrupting the LiDAR scanning process. For example, the controller 214 can be configured to adjust the bias set point of the APD 206 during one or more windows of dead-time in the LiDAR scanning process, such as by using any dead-time in the scan, for example at the end of a scan line or end of a frame. These windows of dead-time may occur at polygon facet crossings or at the extremities of a galvo scan where a detector may not be in use. In some implementations, adaptation of the APD bias set point can be spread out across a number of different dead-time windows as desired or necessary.

Figure 4:
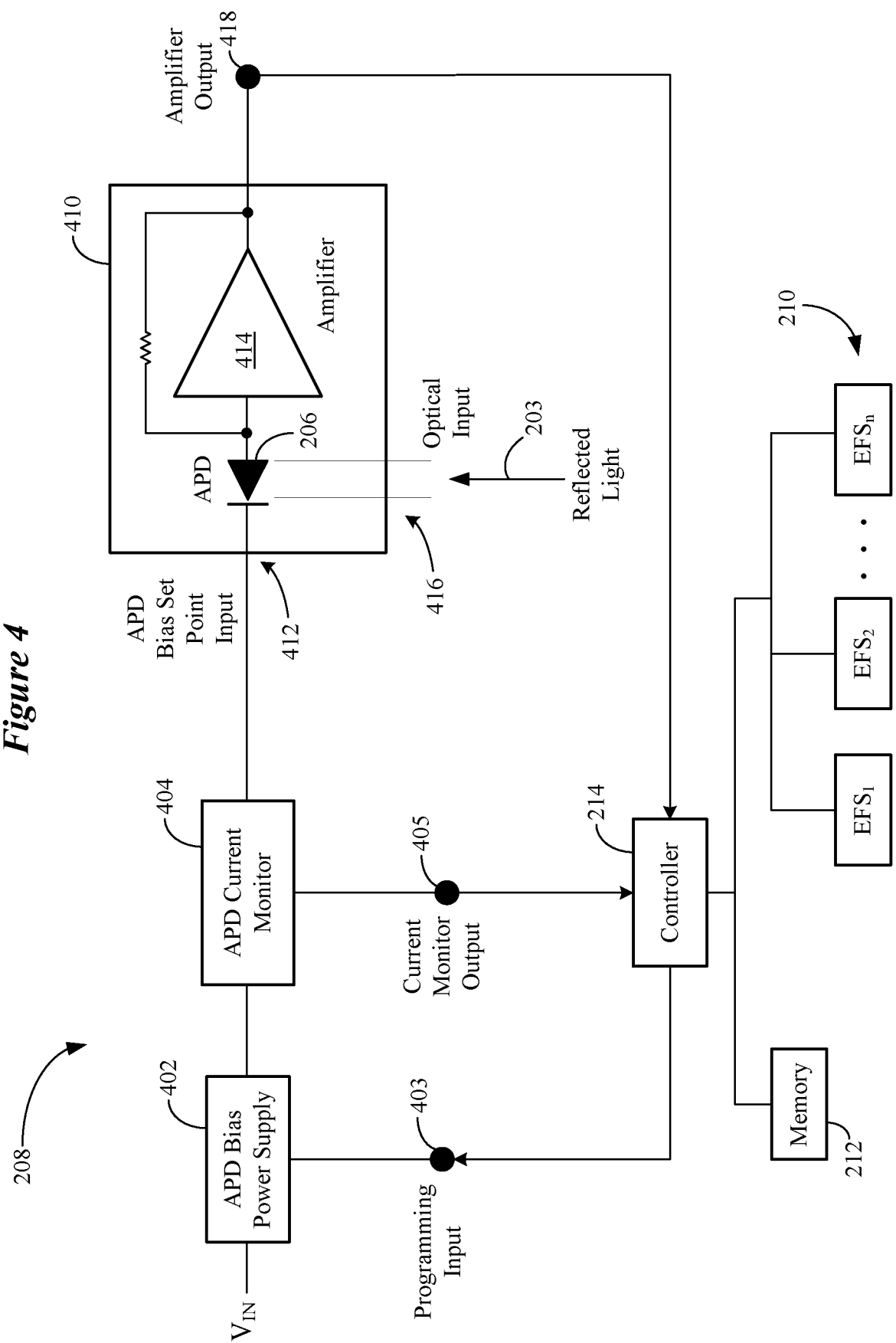
FIG. 4 illustrates details of the bias circuitry shown in FIGS. 2 and 3 in accordance with various embodiments.

FIG. 4 illustrates details of the bias circuitry 208 shown in FIGS. 2 and 3 in accordance with various embodiments. FIG. 4 illustrates bias circuitry 208 operably coupled to the controller 214 which, in turn, is operably coupled to memory 212 and a set of sensors 210 of a type previously described. In the embodiment shown in FIG. 4, the bias circuitry 208 includes an APD module 410 operably coupled to an APD bias power supply 402. The APD bias power supply 402 is coupled to a voltage source, VIN, such as a 5V source (e.g., a single 5V rail). In some implementations, an APD current monitor 404 is coupled between the APD bias power supply 402 and the APD module 410.

The APD module 410 includes APD 206 coupled to an amplifier 414, an optical port 416, and an APD bias set point input 412. The amplifier 414 can be a transimpedance (e.g., current-to-voltage) amplifier. An output 418 of the amplifier 414 is coupled to the controller 214. The optical port 416 is configured to facilitate communication of reflected light 203 (e.g., from a target) from the light receiving optics 201 (shown in FIG. 2) to APD 206, such as by way of a fiberoptic cable or an optical waveguide. The APD 206 typically requires a relatively high voltage bias to operate, typically between 20V to 90V. This bias voltage is set by the controller 214 via a programming input 403 of the APD bias power supply 402. As described previously, the controller 214 performs adaptation of the APD bias set point in response to real-time environmental conditions as sensed by the set of environmental sensors 210.

It may be desirable to monitor the APD's average current, which indicates optical signal strength, using the APD current monitor 404. This information can be communicated to the controller 214 via an APD current monitor output 405. The average current of the APD 206 can be used by the controller 214 to maintain optical signal strength at a desired (e.g., optimal) level. It is noted that APD current is typically between 100 nA and 1 mA.

Figure 5:
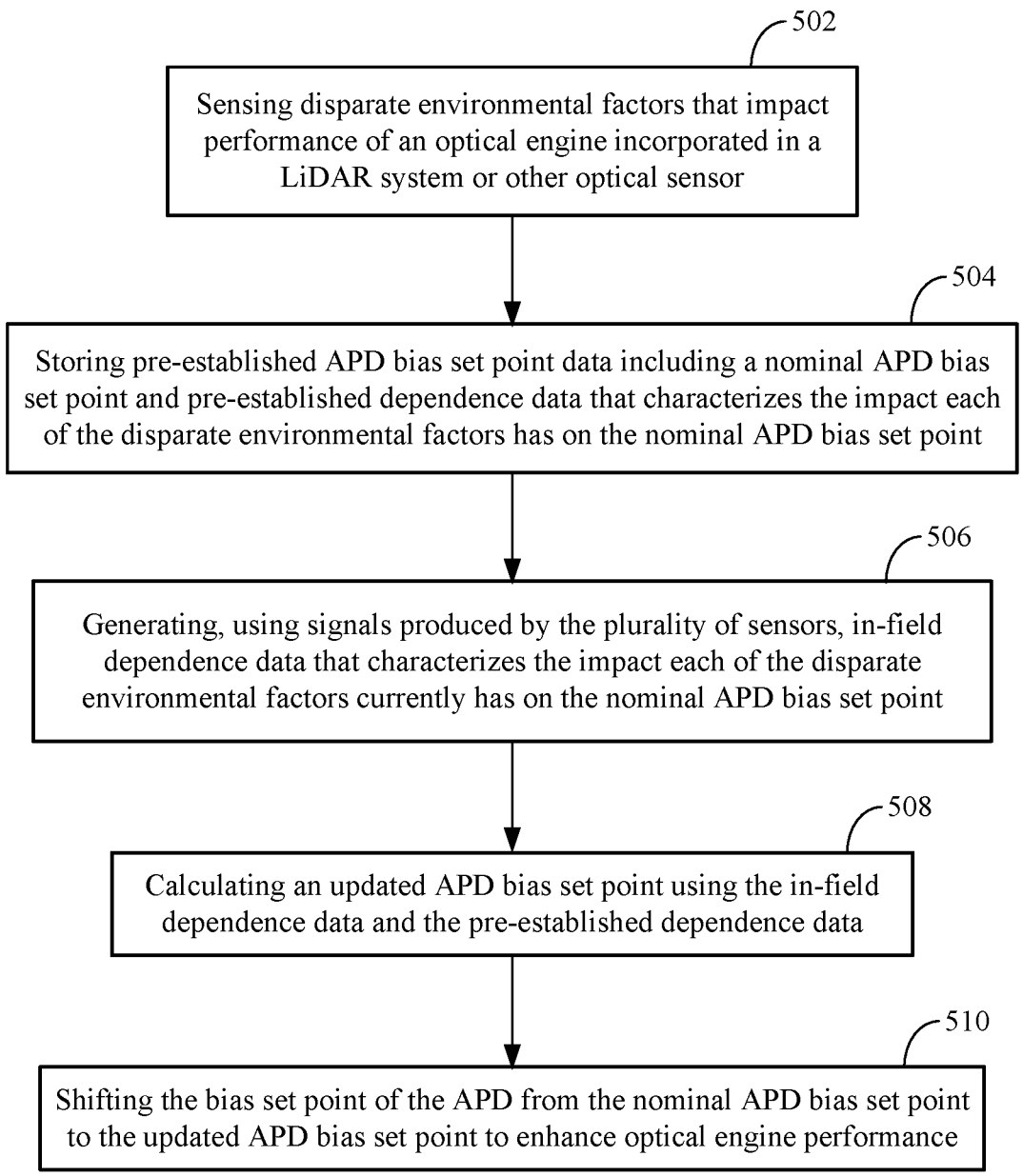
FIG. 5 illustrates a method of adapting the bias set point of an APD to enhance or optimize optical performance in response to changing environmental conditions in accordance with various embodiments.

FIG. 5 illustrates a method of adapting the bias set point of an APD to enhance or optimize optical performance in response to changing environmental conditions in accordance with various embodiments. The method illustrated in FIG. 5 can be implemented by any of the systems, devices, or circuits shown in FIGS. 1-4. The method shown in FIG. 5 involves sensing 502 disparate environmental factors that impact performance of an optical engine incorporated in a LiDAR system or other optical sensor. The method involves storing 504 pre-established APD bias set point data including a nominal APD bias set point and pre-established dependence data that characterizes the impact each of the disparate environmental factors has on the nominal APD bias set point. The method also involves generating 506, using signals produced by the plurality of sensors, in-field dependence data that characterizes the impact each of the disparate environmental factors currently has on the nominal APD bias set point. The method further involves calculating 508 an updated APD bias set point using the in-field dependence data and the pre-established dependence data. The method also involves shifting 510 the bias set point of the APD from the nominal APD bias set point to the updated APD bias set point and operating the APD at the updated APD bias set point to enhance optical engine performance.

In general, the processes illustrated in FIG. 5 are performed by components of an optical engine incorporated in a LiDAR system or other optical sensor. In some embodiments, various processes can be performed by components external to, or remote from, the optical engine and LiDAR system or other optical sensor. For example, the pre-established APD bias set point data can be stored 504 in the cloud (e.g., a cloud server) and transferred to the optical engine via a communication link (e.g., a wireless link). By way of further example, the in-field dependence data and the updated APD bias set point can be stored 504 locally or in the cloud. Storing the pre-establish APD bias set point data, in-field dependence data, and updated APD bias set point in the cloud allows a cloud processor to monitor APD bias set point calibration data over time for a multiplicity of optical engines.

Figure 6:
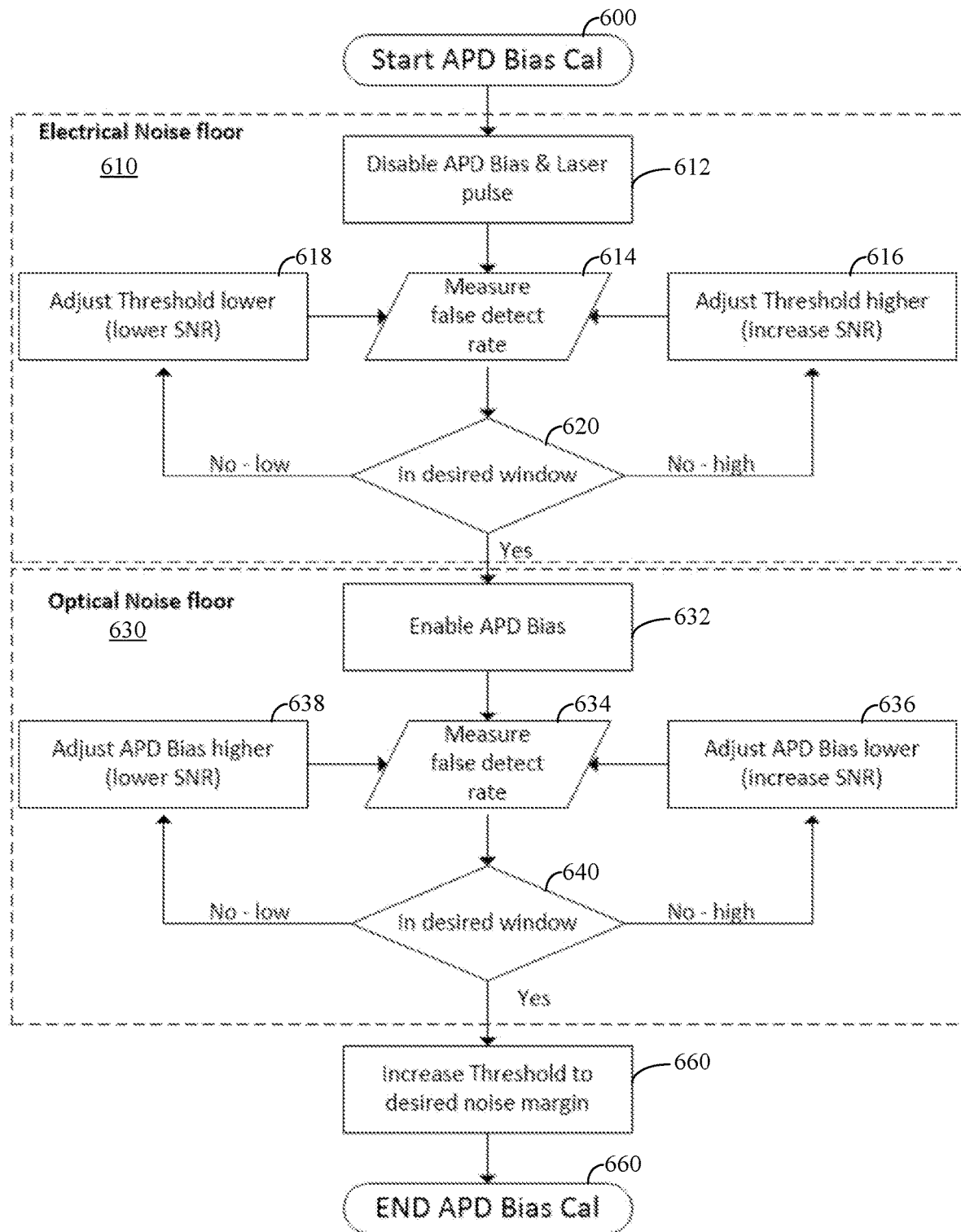
FIG. 6 illustrates an APD bias set point calibration method in accordance with various embodiments.

FIG. 6 illustrates an APD bias set point calibration method in accordance with various embodiments. The adaptive calibration method shown in FIG. 6 is a two-step process that calibrates the bias set point of an APD to account for changes in electrical and optical noise as environmental conditions change. The calibration method shown in FIG. 6 can be implemented by, or in cooperation with, the controller 214 shown in FIGS. 1-4. After initiating 600 the APD bias set point calibration process, the electrical noise floor of the APD is adjusted. After adjusting 610 the electrical noise floor of the APD, the calibration process continues by adjusting 630 an optical noise floor of the APD. The calibration process works to optimize the electrical noise floor and the optical noise floor in response to each change of the disparate environmental factors impacting performance of the optical engine during operation.

Adjusting 610 the electrical noise floor of the APD involves disabling 612 APD bias and the light source (e.g., laser). A false detection rate is measured 614 at the output of the analog channel while APD bias and the light source are disabled. A check 620 is made to determine if the measured false detection rate falls within the desired window. If too high, a false detection rate threshold is increased 616 (corresponding to an increased SNR). If too low, the false detection rate threshold is reduced 618 (corresponding to a decreased SNR). The false detection rate threshold of the analog channel is adjusted until the desired false detection rate is achieved.

Adjusting 630 the optical noise floor of the APD involves enabling 632 APD bias and adjusting the bias set point until a specified false detection rate is exceeded. The false detection rate is measured 634 at the output of the analog channel while the APD bias is enabled. A check 640 is made to determine if the measured false detection rate falls within the desired window. If too high, the APD bias set point is lowered 636 (which corresponds to an increased SNR). If too low, the APD bias set point is increased 638 (which corresponds to a decreased SNR). The method involves increasing 660 the false detection rate threshold to the desired noise margin, after which the APD bias calibration process is terminated 660.

Figure 7:
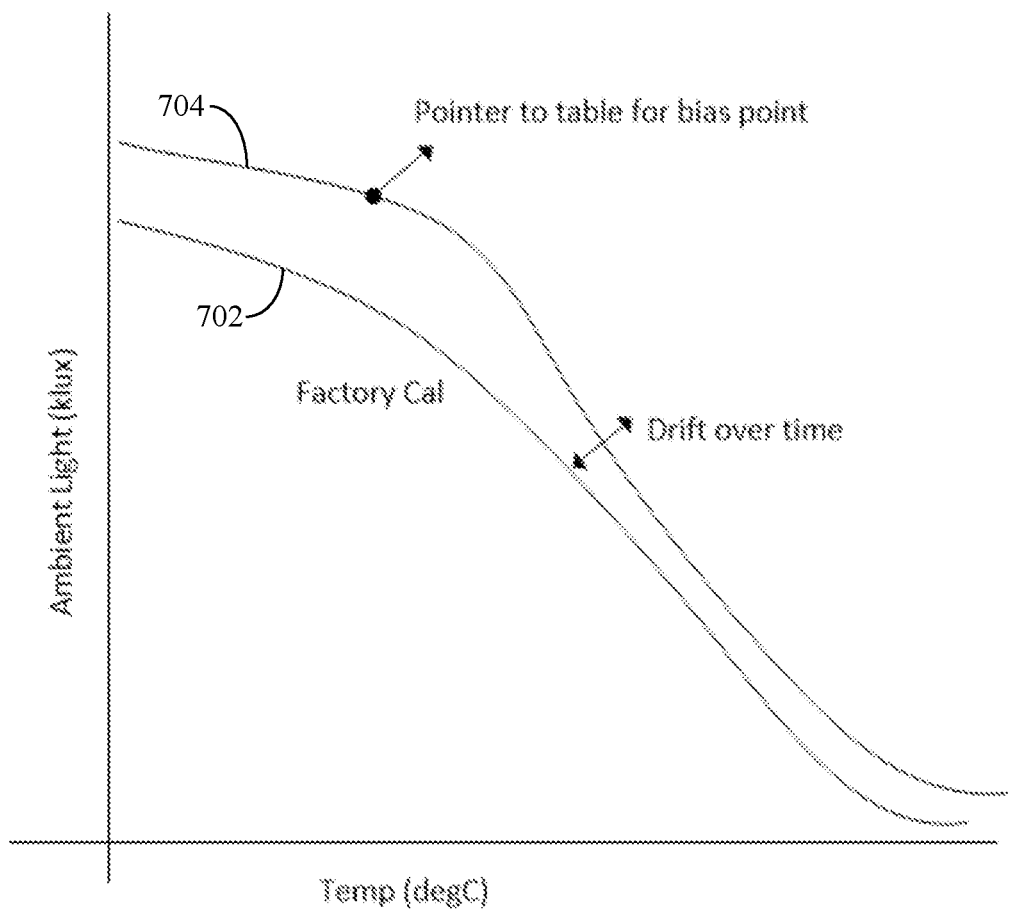
FIG. 7 illustrates a representative complementary calibration process for adapting the APD bias set point to account for drift over time relative to a pre-established (e.g., factory) calibration curve in accordance with various embodiments.

In accordance with some embodiments, a complementary calibration process involves measuring the ambient light level as a second process input variable and previously adapted APD bias set point (adapted to temperature) is stored for that particular ambient light level. As processes drift during in-field operation of the optical engine, an estimation of the changes can be used to adapt the APD bias set point to an enhanced or optimal position. FIG. 7 illustrates a representative complementary calibration process for adapting the APD bias set point to account for drift over time relative to a pre-established (e.g., factory) calibration curve. Curve 702 represents pre-established (e.g., factory) ambient light versus ambient temperature dependence data associated with a nominal APD bias set point established at the time of manufacture. Curve 704 represents ambient light versus ambient temperature dependence data generated in real time during in-field operation. Using curves 702 and 704, an updated APD bias set point can be calculated, such as by using a pointer to a table or array of APD bias set point data.

The controller 110, 214 shown in FIGS. 1-4 can include one or more processors or other logic devices. For example, the controller 110, 214 can be representative of any combination of one or more logic devices (e.g., multi-core processor, digital signal processor (DSP), microprocessor, programmable controller, general-purpose processor, special-purpose processor, hardware controller, software controller, a combined hardware and software device) and/or other digital logic circuitry (e.g., ASICs, FPGAs), and software/firmware configured to implement the functionality disclosed herein. The controller 110, 214 can incorporate or be coupled to various analog and digital components (e.g., ADCs, DACs, filters (e.g., FIR filter, Kalman filter), decoders, encoders, detectors, registers, I/O interfaces). The controller 110, 214 can incorporate or be coupled to memory 212. The memory 212 can include one or more types of memory, including ROM, RAM, SDRAM, NVRAM, EEPROM, FLASH, and SSD memory, for example.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of" "consisting of," and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An apparatus, comprising:
    an optical engine configured for incorporation in a light detection and ranging (LiDAR) system and comprising:
        an analog detection channel comprising an avalanche photodiode (APD) optically coupled to light receiving optics; and
        bias circuitry coupled to the APD and configured to adjust a bias set point of the APD;
    a plurality of sensors configured to sense disparate environmental factors that impact performance of the optical engine;
    a memory configured to store pre-established APD bias set point data including a nominal APD bias set point and pre-established dependence data that characterizes the impact each of the disparate environmental factors has on the nominal APD bias set point; and
    a controller coupled to the memory and configured to:
        generate, using signals produced by the plurality of sensors, in-field dependence data that characterizes the impact each of the disparate environmental factors currently has on the nominal APD bias set point;
        calculate an updated APD bias set point using the in-field dependence data and the pre-established dependence data; and
        shift the bias set point of the APD from the nominal APD bias set point to the updated APD bias set point to enhance optical engine performance.

2. The apparatus of claim 1, wherein the pre-established APD bias set point data comprises factory APD bias set point data established at the time of apparatus manufacture.

3. The apparatus of claim 1, wherein the pre-established APD bias set point data comprises previously generated in-field dependence data alone or in combination with factory APD bias set point data pre-established at the time of apparatus manufacture.

4. The apparatus of claim 1, wherein the controller is configured to implement a feedforward bias set point adjustment process when adjusting the bias set point of the APD.

5. The apparatus of claim 1, wherein the controller is configured to calculate the updated APD bias set point by performing interpolation operations using the in-field and pre-established dependence data for each of the disparate environmental factors.

6. The apparatus of claim 1, wherein the disparate environmental factors sensed by the plurality of sensors comprises two or more of ambient light level, ambient temperature, ambient humidity, and aging of the optical engine.

7. The apparatus of claim 1, wherein the controller is configured to shift the bias set point of the APD during a LiDAR scanning process and without interrupting the LiDAR scanning process.

8. The apparatus of claim 1, wherein the controller is configured to adjust the bias set point of the APD during one or more windows of dead-time in a LiDAR scanning process.

9. The apparatus of claim 1, wherein:
    the analog detection channel has a specified gain profile; and
    the controller is configured to adjust the bias set point of the APD to achieve the specified gain profile in response to changes of the disparate environmental factors.

10. The apparatus of claim 1, wherein the controller is configured to:
    adjust an electrical noise floor of the APD while APD bias and the light source are disabled; and
    adjust an optical noise floor of the APD with the APD bias enabled and the light source disabled.

11. The apparatus of claim 10, wherein the controller is configured to optimize the electrical noise floor and the optical noise floor in response to each change of the disparate environmental factors impacting performance of the optical engine during operation.

12. The apparatus of claim 1, wherein the controller is configured to:
    disable APD bias and the light source;
    measure a false detection rate at an output of the analog detection channel while APD bias and the light source are disabled;
    enable APD bias and adjust the bias set point until a specified false detection rate is exceeded; and
    bias the APD at the adjusted bias set point.

13. A method, comprising:
    sensing disparate environmental factors that impact performance of an optical engine incorporated in a light detection and ranging (LiDAR) system, the optical engine including an analog detection channel comprising an avalanche photodiode (APD) optically coupled to light receiving optics, and bias circuitry coupled to the APD and configured to adjust a bias set point of the APD;
    storing, in a memory, pre-established APD bias set point data including a nominal APD bias set point and pre-established dependence data that characterizes the impact each of the disparate environmental factors has on the nominal APD bias set point;

generating, by a controller using signals produced by the plurality of sensors, in-field dependence data that characterizes the impact each of the disparate environmental factors currently has on the nominal APD bias set point;

calculating, by the controller, an updated APD bias set point using the in-field dependence data and the pre-established dependence data; and shifting, by the controller, the bias set point of the APD from the nominal APD bias set point to the updated APD bias set point to enhance optical engine performance.

14. The method of claim 13, wherein the pre-established APD bias set point data comprises one or both of factory APD bias set point data established at the time of apparatus manufacture and previously generated in-field dependence data.

15. The method of claim 13, wherein calculating the updated APD bias set point comprises performing interpolation operations using the in-field and pre-established dependence data for each of the disparate environmental factors.

16. The method of claim 13, wherein the disparate environmental factors sensed by the plurality of sensors comprises two or more of ambient light level, ambient temperature, ambient humidity, aging of the apparatus.

17. The method of claim 13, wherein shifting the bias set point of the APD is performed during a LiDAR scanning process and without interrupting a LiDAR scanning process.

18. The method of claim 13, wherein shifting the bias set point of the APD is performed during one or more windows of dead-time in a LiDAR scanning process.

19. The method of claim 13, wherein:
the analog detection channel has a specified gain profile; and
the method comprises adjusting, by the controller, the bias set point of the APD to achieve the specified gain profile in response to changes of the disparate environmental factors.

20. The method of claim 13, comprising:
adjusting, by the controller, an electrical noise floor of the APD while APD bias and the light source are disabled; and
adjusting, by the controller, an optical noise floor of the APD with the APD bias enabled and the light source disabled.

21. The apparatus of claim 20, comprising optimizing, by the controller, the electrical noise floor and the optical noise floor in response to each change of the disparate environmental factors impacting performance of the optical engine during operation.

22. The method of claim 13, comprising:
disabling, by the controller, APD bias and the light source;
measuring, by the controller, a false detection rate at an output of the analog detection channel while APD bias and the light source are disabled;
enabling, by the controller, APD bias and adjust the bias set point until a specified false detection rate is exceeded; and
biasing, by the controller, the APD at the adjusted bias set point.

* * * * *